United States Patent
Yonezawa et al.

(10) Patent No.: US 8,311,291 B2
(45) Date of Patent: Nov. 13, 2012

(54) FACE IMAGE DETECTING DEVICE, FACE IMAGE DETECTING METHOD, AND FACE IMAGE DETECTING PROGRAM

(75) Inventors: Toru Yonezawa, Hyogo (JP); Kozo Kawata, Hyogo (JP)

(73) Assignee: Glory Ltd., Himeji-shi (JP)

( * ) Notice: Subject to any disclaimer, the term of this patent is extended or adjusted under 35 U.S.C. 154(b) by 992 days.

(21) Appl. No.: 11/996,569

(22) PCT Filed: Jul. 26, 2006

(86) PCT No.: PCT/JP2006/314806
§ 371 (c)(1),
(2), (4) Date: Jan. 23, 2008

(87) PCT Pub. No.: WO2007/013529
PCT Pub. Date: Feb. 1, 2007

(65) Prior Publication Data
US 2009/0041357 A1    Feb. 12, 2009

(30) Foreign Application Priority Data
Jul. 27, 2005 (JP) ................. 2005-217711

(51) Int. Cl.
*G06K 9/00* (2006.01)
*G06K 9/56* (2006.01)
*G06K 9/36* (2006.01)

(52) U.S. Cl. ........ 382/118; 382/103; 382/115; 382/117; 382/155; 382/199; 382/205; 382/291

(58) Field of Classification Search ................. 382/118, 382/103, 115, 117, 155, 181, 199, 205, 291
See application file for complete search history.

(56) References Cited

U.S. PATENT DOCUMENTS

| | | | | |
|---|---|---|---|---|
| 5,710,590 A * | 1/1998 | Ichige et al. | ............... | 348/14.01 |
| 6,108,437 A * | 8/2000 | Lin | ............... | 382/118 |
| 6,549,644 B1 * | 4/2003 | Yamamoto | ............... | 382/118 |
| 7,155,036 B2 * | 12/2006 | Li | ............... | 382/118 |
| 7,227,996 B2 | 6/2007 | Imagawa et al. | | |

(Continued)

FOREIGN PATENT DOCUMENTS
EP    0 984 386 A2    3/2000
(Continued)

OTHER PUBLICATIONS

P. Viola et al., "Rapid Object Detection Using a Boosted Cascade of Simple Features," Proceedings of IEEE Computer Society Conference on Computer Vision and Pattern Recognition, vol. 1. Dec. 2001, pp. 511-518.

(Continued)

*Primary Examiner* — Michael A Newman
(74) *Attorney, Agent, or Firm* — Foley & Lardner LLP (57) ABSTRACT

An extraction-pattern storing unit stores therein information related to a plurality of different extraction patterns for extracting a predetermined number of pixels from pixels surrounding a pixel that is a target for detecting a face part image. A face-part-image detecting unit extracts a pixel using the different extraction patterns stored in the extraction-pattern storing unit, and detects the face part image included in an image using a feature amount of an extracted pixel. A face-image detecting unit detects a face image from the image based on the face part image detected by the face-part-image detecting unit.

21 Claims, 7 Drawing Sheets

U.S. PATENT DOCUMENTS

| | | | |
|---|---|---|---|
| 7,295,709 B2* | 11/2007 | Cootes et al. | 382/199 |
| 2001/0002932 A1* | 6/2001 | Matsuo et al. | 382/118 |
| 2001/0031129 A1 | 10/2001 | Tajima | |
| 2001/0036298 A1* | 11/2001 | Yamada et al. | 382/118 |
| 2003/0044073 A1 | 3/2003 | Matsugu et al. | |
| 2005/0041867 A1* | 2/2005 | Loy et al. | 382/190 |
| 2005/0100195 A1* | 5/2005 | Li | 382/118 |
| 2006/0120572 A1* | 6/2006 | Li et al. | 382/118 |
| 2006/0280341 A1* | 12/2006 | Koshizen et al. | 382/118 |

FOREIGN PATENT DOCUMENTS

| | | |
|---|---|---|
| JP | 7-220090 A | 8/1995 |
| JP | 11-120351 A | 4/1999 |
| JP | 2002-304627 A | 10/2002 |
| JP | 2003-317084 A | 11/2003 |
| JP | 2004-054442 A | 2/2004 |
| JP | 2004-362468 A | 12/2004 |

OTHER PUBLICATIONS

H. Schneiderman et al., "A Statistical Method for 3D Object Detection Applied to Faces and Cars," Proceedings IEEE Computer Society Conference on Computer Vision and Pattern Recognition, vol. 1, Sep. 1, 2000, pp. 746-751.

Z. Liu et al., "Face Detection Using Region Information," Biometric Technology for Human Identification, Proceedings of SPIE, vol. 5404, Apr. 12, 2004, pp. 492-501.

K. Lam, "A Fast Approach for Detecting Human Faces in a Complex Background," Circuits and Systems, Proceedings of the 1998 IEEE International Symposium in Monterey, vol. 4, May 31, 1998, pp. 85-88.

J. Wu et al., "Efficient face candidates selector for face detection," Pattern Recognition, vol. 36, No. 5, May 1, 2003, pp. 1175-1186.

G. Holst, "Face Detection by Facets: Combined Bottom-Up and Top-Down Search Using Compound Templates", Proceedings IEEE Intl. Conf. on Computer Vision, vol. 2, 2000, pp. 235-238.

* cited by examiner

FACE IMAGE DETECTING DEVICE, FACE IMAGE DETECTING METHOD, AND FACE IMAGE DETECTING PROGRAM

TECHNICAL FIELD

The present invention relates to a face-image detecting apparatus, a face-image detecting method, and a face-image detecting program for detecting a face image included in an image, and more particularly, to a face-image detecting apparatus, a face-image detecting method, and a face-image detecting program with a capability of improving accuracy of detecting the face image and shortening process time for detecting the face image.

BACKGROUND ART

Conventionally, in surveillance camera systems and the like, a face-image detecting technology that automatically recognizes whether a human face is present in an image taken by a surveillance camera is known. A subspace method and an Integral Image method are examples of the face-image detecting technology.

As an example of the face-image detecting technology using the subspace method, a technology has been developed that can detect a face image by recognizing face parts such as the eyes and the nose in an image by using a subspace, integrating recognition results of the face parts so as to absorb individual differences in the position of each face part, and calculating a reference point of a face (refer to Patent Document 1).

As an example of the face-image detecting technology using the Integral Image method, a technology has been developed that can detect a face image by setting a plurality of rectangular areas in an image, and comparing total values of feature amounts of all the pixels included in each rectangular area (refer to Patent Document 2 and Non-Patent Document 1).

[Patent Document 1] Japanese Patent Application Laid-open No. 2004-54442

[Patent Document 2] Japanese Patent Application Laid-open No. 2004-362468

[Non-Patent Document 1] Paul Viola and Michael Jones, "Rapid Object Detection using a Boosted Cascade of Simple Features", In Proceedings of IEEE Computer Society Conference on Computer Vision and Pattern Recognition, Vol. 1, pp. 511-518, December 2001

DISCLOSURE OF INVENTION

Problem to be Solved by the Invention

However, in the related art, it is difficult to improve the detection accuracy, while further shortening the time required for the detection process of a face image.

More particularly, in the face-image detecting technology using the subspace method, when the face part is to be recognized, the subspace method, which is a complicated process, needs to be applied to each face part. Accordingly, the process requires a long time. Because the reference point of a face is calculated by simply integrating the recognition results of the face parts, something that is not a face part may be recognized as a face part by mistake in an image with a number of edges. Accordingly, the detection accuracy of a face deteriorates.

In the face-image detecting technology using the Integral Image method, the area of the rectangular area in which the total value of the feature amounts is calculated is set relatively large, to shorten the time required for the detection process of the face image. However, in an image in which a face is exposed to the direct sunlight, for example, if the area of the rectangular area is large, the total value of the feature amounts fluctuates greatly under the influence of the direct sunlight. Accordingly, there is a possibility that the face image may not be detected properly.

Therefore, developments of technologies that can improve a detection accuracy of a face, and shorten the time required for a detection process still remain as an important issue.

The present invention has been made to solve the above problems of the conventional technologies, and intends to provide a face-image detecting apparatus, a face-image detecting method, and a face-image detecting program that can improve the accuracy of detecting a face image and shorten the process time for detecting the face image.

Means for Solving Problem

To solve the above problems and to achieve the object, the face-image detecting apparatus according to an aspect of the present invention detects a face image included in an image. The face-image detecting apparatus includes an extraction-pattern storing unit that stores therein information related to a plurality of different extraction patterns for extracting a predetermined number of pixels from pixels surrounding a pixel that is a target for detecting a face part image; a face-part-image detecting unit that extracts a pixel using the different extraction patterns stored in the extraction-pattern storing unit, and detects the face part image included in the image using a feature amount of an extracted pixel; and a face-image detecting unit that detects the face image from the image based on the face part image detected by the face-part-image detecting unit.

Furthermore, the face-image detecting apparatus according to another aspect of the present invention, further includes an extraction-pattern learning unit that executes a machine learning of an extraction pattern used for detecting the face part image. The extraction-pattern storing unit stores therein information related to the extraction pattern that is machine-learned by the extraction-pattern learning unit.

Moreover, the face-image detecting apparatus according to still another aspect of the present invention, upon performing a detection the face part image using a predetermined extraction pattern, the face-part-image detecting unit excludes a pixel from which the face part image is not detected from a target pixel for detecting the face part image using a next extraction pattern.

Furthermore, the face-image detecting apparatus according to still another aspect of the present invention, the face part detecting unit executes a discrimination analysis for determining whether an image is a face part image using the feature amount of the extracted pixel, and detects the face part image based on a result of the discrimination analysis.

Moreover, the face-image detecting apparatus according to still another aspect of the present invention, the face-part-image detecting unit calculates a direction and a strength of an image pattern included in the image, and detects the face part image included in the image using calculated direction and strength of the image pattern as the feature amount of the pixel.

Furthermore, the face-image detecting apparatus according to still another aspect of the present invention, the face-image detecting unit determines whether an image is a face image based on a position of the face part image detected by the face-part-image detecting unit, and detects the face image from the image based on a result determination.

Moreover, the face-image detecting apparatus according to still another aspect of the present invention, the face-image detecting unit calculates a representative point of the face image based on the position of the face part image detected by the face part detecting unit, and determines whether an image is a face image based on a positional relationship between a calculated representative point and the face part image detected by the face-part-image detecting unit.

Furthermore, the face-image detecting apparatus according still another aspect of the present invention, the face-image detecting unit divides the image into a plurality of areas based on the representative point, and detects the face image by determining whether an image is a face image based on information of an area where the face part image is positioned when the face part image is detected by the face-part-image detecting unit.

Moreover, the face-image detecting apparatus according to still another aspect of the present invention, the face-image detecting unit executes a discrimination analysis for determining whether an image is a face image using the information of the area where the face part image is positioned, and detects the face image based on a result of the discrimination analysis.

Furthermore, the face-image detecting method according to an aspect of the present invention is for detecting a face image included in an image. The face-image detecting method includes an extraction-pattern storing step of storing information related to a plurality of different extraction patterns for extracting a predetermined number of pixels from pixels surrounding a pixel that is a target for detecting a face part image; a face-part-image detecting step including extracting a pixel using the different extraction patterns stored at the extraction-pattern storing step, and detecting the face part image included in the image using a feature amount of an extracted pixel; and a face-image detecting step of detecting the face image from the image based on the face part image detected at the face-part-image detecting step.

Moreover, the face-image detecting program according to another aspect of the present invention is for detecting a face image included in an image. The face-image detecting program causes a computer to execute an extraction-pattern storing procedure of storing information related to a plurality of different extraction patterns for extracting a predetermined number of pixels from pixels surrounding a pixel that is a target for detecting a face part image; a face-part-image detecting procedure including extracting a pixel using the different extraction patterns stored at the extraction-pattern storing procedure, and detecting the face part image included in the image using a feature amount of an extracted pixel; and a face-image detecting procedure of detecting the face image from the image based on the face part image detected at the face-part-image detecting procedure.

Effect of the Invention

According to the invention of claim 1, information related to a plurality of different extraction patterns that extract a predetermined number of pixels from pixels surrounding a pixel to be detected of a face part image is stored, the pixels are extracted by using the different extraction patterns stored, the face part image in an image is detected by using feature amounts of the pixels being extracted, and a face image is detected from the image based on the face part image being detected. By controlling the number of pixels to be extracted, a detection process of the face part image can be performed at a high speed, and the time required for detecting a face image can be advantageously shortened. In this manner, a detection accuracy of a face can be advantageously improved by detecting a face part image, which is a base for detecting a face image, a plurality of times.

Furthermore, according to the invention of claim 2, machine learning of the extraction patterns used for detecting a face part image is executed, and information related to the extraction patterns being machine-learned are stored. In this manner, the extraction patterns and the like that extract the pixels of a portion with little illumination fluctuation can efficiently be selected.

Moreover, according to the invention of claim 3, when the face part image is detected by using a certain extraction pattern, a pixel to be detected that has been used and failed to detect the face part image is excluded as a pixel to be detected to detect the face part image by using the next extraction pattern. In this manner, the time required for the detection process of the face image can further be shortened.

Furthermore, according to the invention of claim 4, a discrimination analysis for determining whether the image is a face part image is executed by using the feature amounts of the pixels being extracted, and the face part image is detected based on a result of the discrimination analysis. In this manner, whether the image is a face part image can effectively be determined, thereby advantageously enabling to further shorten the time required for the detection process of the face image.

Moreover, according to the invention of claim 5, a direction and strength of an image pattern included in the image is calculated, and the face part image in the image is detected by using the direction and the strength of the image pattern being calculated as the feature amounts of the pixels. By using the direction and the strength of the image pattern as the feature amounts, the image pattern such as an edge can be detected with accuracy. In this manner, the detection accuracy of the face part image can be advantageously improved.

Furthermore, according to the invention of claim 6, whether the image is a face image is determined based on a position of the face part image being detected, and the face image is detected from the image based on a determination result. In this manner, even if something that is not a face part image is detected as a face part image by mistake, it can be properly detected, thereby advantageously enabling to improve the detection accuracy of the face image.

Moreover, according to the invention of claim 7, a representative point of the face image is calculated based on the position of the face part image being detected, and whether the image is a face image is determined based on a positional relationship between the representative point being calculated and the face part image being detected. In this manner, the position of the point that represents the face image in the image can be properly detected, thereby advantageously enabling to improve the detection accuracy of the face image.

Furthermore, according to the invention of claim 8, the image is divided into a plurality of areas based on the representative point, and when the face part image is detected, the face image is detected by determining whether the image is a face image based on information of an area where the face part image is positioned. By checking an area where the face part image exists, even if something that is not a face part is detected as a face part by mistake, it can be properly and efficiently detected. In this manner, the detection accuracy of the face image can be advantageously improved.

Moreover, according to the invention of claim 9, the discrimination analysis that determines whether the image is a face image is executed by using the information of the area where the face part image is positioned, and the face image is detected based on the result of the discrimination analysis. In this manner, whether the image is a face image can be determined effectively, thereby advantageously enabling to improve the detection accuracy of the face image.

Furthermore, according to the invention of claim 10, information related to a plurality of different extraction patterns that extract a predetermined number of pixels from pixels surrounding a pixel to be detected of a face part image is stored, the pixels are extracted by using the different extraction patterns stored, the face part image in an image is detected by using feature amounts of the pixels being extracted, and a face image is detected from the image based on the face part image being detected. By controlling the number of pixels to be extracted, a detection process of the face part image can be performed at a high speed, and the time required for detecting a face image can be advantageously shortened. In this manner, a detection accuracy of a face can be advantageously improved by detecting a face part image, which is a base for detecting a face image, a plurality of times.

Moreover, according to the invention of claim 11, information related to a plurality of different extraction patterns that extract a predetermined number of pixels from pixels surrounding a pixel to be detected of a face part image is stored, the pixels are extracted by using the different extraction patterns stored, the face part image in an image is detected by using feature amounts of the pixels being extracted, and a face image is detected from the image based on the face part image being detected. By controlling the number of pixels to be extracted, a detection process of the face part image can be performed at a high speed, and the time required for detecting a face image can be advantageously shortened. In this manner, a detection accuracy of a face can be advantageously improved by detecting a face part image, which is a base for detecting a face image, a plurality of times.

EXPLANATIONS OF LETTERS OR NUMERALS

10 Input image
11a, 11b, 11c Reduced image
12a, 12b, 12c Template
13 Representative point
14 Divided area
20 Input unit
21 Displaying unit
22 Learning processing unit
23 Reduced/enlarged-image generating unit
24 Gabor-feature-image generating unit
25 Template selecting unit
26 Face-part-image detecting unit
27 Face-image representative-point calculating unit
28 Face-image-detection feature-amount generating unit
29 Face-image detecting unit
30 Storage unit
30a Input image
30b Reduced/enlarged images
30c Gabor feature image
30d Template information
30e Face-part-image-detection linear discriminant
30f Face-part-image discrimination result
30g Representative-point setting information
30h Face-image-detection linear discriminant
30i Face-image discrimination result
31 Control unit
40a, 40b Existence probability distribution
100 Keyboard
101 Display
102 ROM
103 Medium reading device
104 Network interface
105 CPU
105a Face-image detecting process
106 HDD
107 HD
107a Face-image detecting program
107b Various data
108 RAM
108a Various data
109 Bus

BEST MODE(S) FOR CARRYING OUT THE INVENTION

Exemplary embodiments of a face-image detecting apparatus, a face-image detecting method, and a face-image detecting program according to the present invention will be described in detail below with reference to the accompanying drawings.

Embodiments

Figure 1:
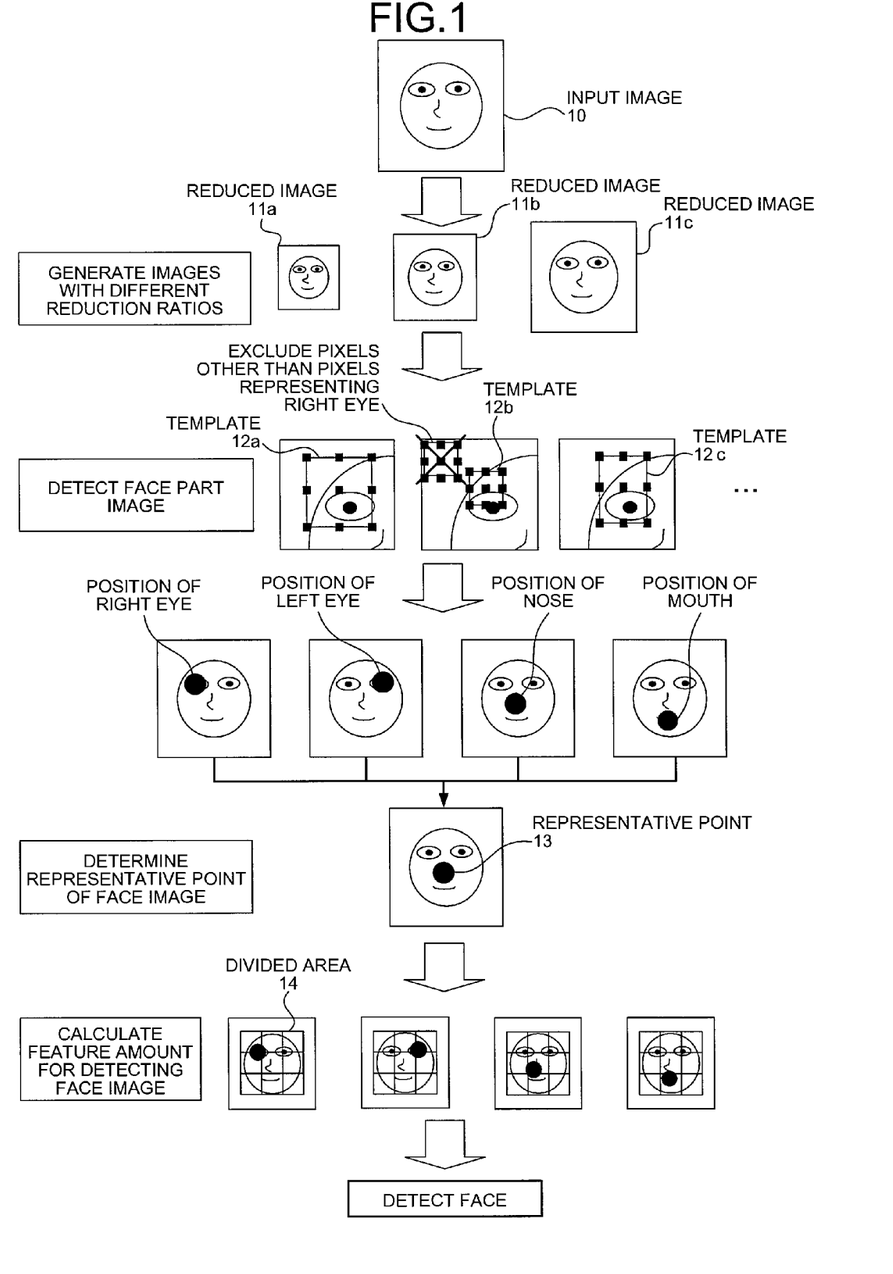
FIG. 1 is a schematic diagram for explaining a concept of a face-image detecting process according to the present invention.

A concept of a face-image detecting process according to the present invention will be explained first. FIG. 1 is a schematic diagram for explaining a concept of a face-image detecting process according to the present invention.

As shown in FIG. 1, in the face-image detecting process, a plurality of reduced images 11a to 11c with different reduction ratios are generated from an input image 10 that is to be detected whether a face image is included. While generation of the reduced images 11a to 11c is herein explained, when the size of the face image included in the input image 10 is presumed to be smaller than a predetermined size in advance, a plurality of enlarged images with different enlargement ratios will be generated. When the size of the face image included in the input image 10 cannot be presumed, the reduced images 11a to 11c and the enlarged images will both be generated. This is to make templates 12a to 12c, which will be described below, applicable to the image. Whether the images of face parts such as the right eye, the left eye, the nose, and the mouth are included in each image is determined by a linear discrimination analysis.

More particularly, a Gabor filter is applied to a pixel value of each pixel of the image, and an edge strength and an edge direction of each pixel are calculated. The templates 12a to 12c that are squares centered on a pixel to be detected of a face part image are selected, and information on the edge strength and the edge direction of the pixel to be detected, and of a predetermined number of pixels surrounding the pixel are obtained.

The pixels that correspond to points of four corners of the square and the pixels that correspond to a midpoint of each side of the square are extracted, as the pixels surrounding the pixel to be detected of the face part image. The information on the edge strength and the edge direction at nine pixels in total, including the pixel to be detected, are obtained. The templates 12a to 12c to be used are machine-learned, so as to select the pixels of a face portion with little illumination fluctuation.

Then, by using the obtained information on the edge strength and the edge direction at the nine pixels, a linear discrimination analysis is executed. The linear discrimination analysis determines whether an image portion corresponding to the pixels to be detected of the face part image is a face part image.

More particularly, a discriminant score is calculated by inputting the values of the edge strength and the edge direction to a linear discriminant that determines whether the image is a face part image. The determination is performed based on the value of the discriminant score.

Accordingly, the information on the nine pixels is used to determine whether the image is a face part image, thereby enabling to detect the face part at a high speed. By capturing changes in an edge image among the nine pixels, the face part can be detected properly.

A plurality of types of the templates 12a to 12c, having different horizontal and vertical lengths, are prepared. Because the templates 12a to 12c are used to detect a face part image, a detection accuracy of a face part image can be improved.

While the shape of the templates 12a to 12c are made in square, the shape is not limited to square, and an ellipse and a circle may be used. If the shapes of the templates 12a to 12c are made dependent on the shape of a face part such as the eyes of a certain person, the detection accuracy of other people's face parts may deteriorate. Therefore, the shapes of the templates 12a to 12c should not be made dependent on the shape of any face part.

The number of pixels whose information on the edge strength and the edge direction is obtained is not limited to nine. If the number of pixels is increased, the detection accuracy of the face part image increases. If the number of pixels is decreased, a processing speed of the face part image will be shortened. Therefore, by properly setting the number of pixels, a balance between the detection accuracy and the processing speed can be adjusted.

When the detection process of a face part image is performed using certain templates 12a to 12c and the process determines no face part image, the pixels that were to be detected of the face part image are excluded from the pixels to be detected that detect a face part image by using the other templates 12a to 12c. This can drastically reduce the time required for the detection process of the face part image, thereby enabling to reduce the processing time of the face-image detecting process.

When each face part image is detected by the process, a representative point 13 that represents a position of the face image is determined based on the position of each face part image being detected. More particularly, the direction and the distance (the number of pixels) where the representative point 13 of the face image exists are set in advance, viewed from the pixels to be detected with which the face part image is detected using the respective templates 12a to 12c.

Based on setting information of the direction and the distance, a distribution of the position of the representative point 13 of the face image is calculated from the position of each face part image. The representative point 13 of the face image is determined by calculating the peaks of the distribution.

When the representative point 13 of the face is determined, the image is separated by a predetermined number of pixels, having the representative point 13 in the center, and divided into nine divided areas 14. More particularly, a range of each of the divided areas 14 is set so as four face part images of the right eye, the left eye, the nose, and the mouth are included in the upper left, the upper right, the center, and the lower center of the divided areas 14.

When the range of each of the divided areas 14 is set as such, the face part image exists in a predetermined position, and does not exist in any other position, if the image is a face image. By confirming this, even if something that is not a face part image is detected as a face part image by mistake, the image can be determined not to be a face image, thereby improving the accuracy of the face image detection.

More particularly, a total value of the discriminant scores of the four face part images of the right eye, the left eye, the nose, and the mouth that are positioned at the individual divided areas 14 is calculated. Then, thirty six-dimensional (nine areas times four face parts) feature amounts that determine whether the image shows a face or a non-face is generated from the total value.

Using the generated feature amounts, a thirty six-dimensional linear discrimination analysis that determines whether the image is a face image or a non-face image is performed. More particularly, the discriminant score is calculated by inputting the feature amounts to the linear discriminant. When the discriminant score is larger than a predetermined threshold, the image is determined to be a face image.

The time required for detecting a face image can be shortened to approximately a tenth of the time required by conventional methods, by performing the face-image detecting process using the above-described method. With an image having a number of edges (a number of high-frequency components), the detection accuracy of a face image can be improved by about ten times to that of the conventional ones.

Figure 2:
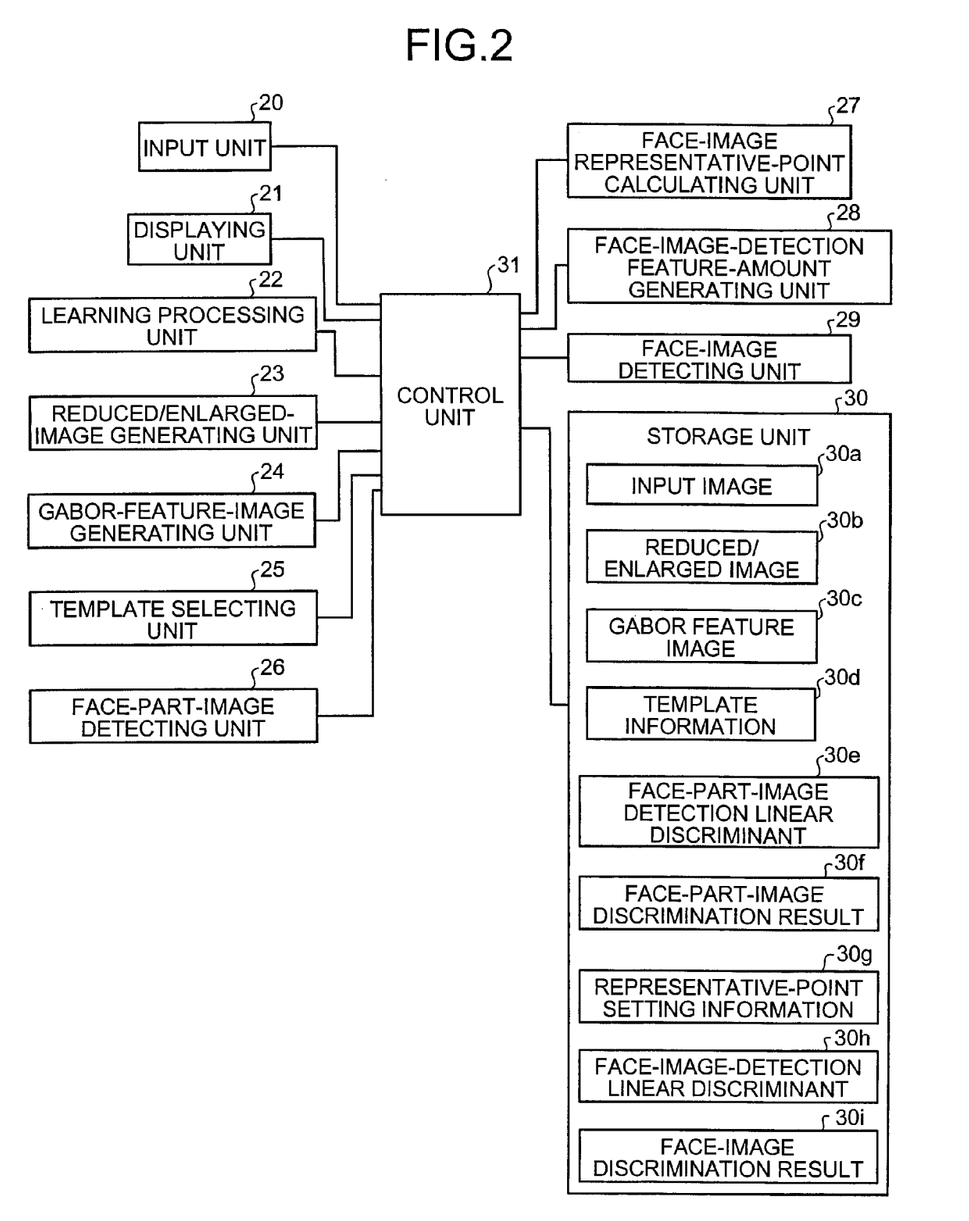
FIG. 2 is a functional setting diagram of a face-image detecting apparatus according to a present embodiment.

Next, a functional setting of a face-image detecting apparatus according to the present embodiment will be described. FIG. 2 is a functional setting diagram of a face-image detecting apparatus according to the present embodiment.

As shown in FIG. 2, the face-image detecting apparatus includes an input unit 20, a displaying unit 21, a learning processing unit 22, a reduced/enlarged-image generating unit 23, a Gabor-feature-image generating unit 24, a template selecting unit 25, a face-part-image detecting unit 26, a face-image representative-point calculating unit 27, a face-image-detection feature-amount generating unit 28, a face-image detecting unit 29, a storage unit 30, and a control unit 31.

The input unit 20 is an input device such as a keyboard or a mouse. The displaying unit 21 is a display device such as a display. The learning processing unit 22 is a processing unit that learns which of the templates 12a to 12c is suitable for an image, when a face part image is detected. More particularly, the learning processing unit 22 learns which of the templates 12a to 12c can extract pixels with little illumination fluctuation and the like, by using a boosting algorithm.

The reduced/enlarged-image generating unit 23 is a generating unit that, when the input image 10 is received, generates a plurality of the reduced images 11a to 11c prepared by reducing the input image 10 with different reduction ratios, and a plurality of enlarged images that are enlarged with different enlargement ratios. More particularly, the reduced/enlarged-image generating unit 23 generates the reduced images 11a to 11c and the enlarged images by performing a linear interpolation. Whether to reduce or enlarge the input image 10 is determined by a relationship between the sizes of the templates 12a to 12c to be used, and the presumed size of the face image included in the input image 10. For example, when the size of the templates 12a to 12c to be used are approximately 20 pixels in height and width, and the size of the presumed face image is equal to or less than 20 pixels in height and width, the reduced/enlarged-image generating unit 23 generates the enlarged images of the input image 10. When the size of the face image cannot be presumed, the reduced/enlarged-image generating unit 23 generates both the reduced images 11a to 11c and the enlarged images.

The Gabor-feature-image generating unit 24 is a generating unit that applies a Gabor filter to each image that is generated by the reduced/enlarged-image generating unit 23, and generates Gabor feature images. More particularly, the Gabor-feature-image generating unit 24 generates the Gabor feature images, by selecting an area of 7 pixels square from the image, and applying the Gabor filter to four directions of 90 degrees apart in the area. The size of the 7 pixels square is set, so that the right eye and the left eye in the image are presumed to be separated approximately by 12 pixels, when the size of the face image is 24 pixels square.

The Gabor filter is expressed by

[Numerical expression 1]

$$g_k = \exp\left\{-\frac{1}{2}\left(\frac{x^2}{\sigma_1^2} + \frac{y^2}{\sigma_2^2}\right)\right\}\exp\left\{\frac{j\pi}{\lambda}(x\cos\theta + y\sin\theta)\right\} \quad (1)$$

$$\theta = \frac{\pi}{2}k, \quad k = 0 \sim 3$$

where j is an imaginary unit, θ is a direction (angle), λ is a wavelength, $\sigma_1$ and $\sigma_2$ are scales, and k is one of four directions of 90 degrees apart.

The Gabor-feature-image generating unit 24 calculates values of a real part $g_k^{real}$ and an imaginary part $g_k^{imag}$ of the Gabor filter. Then, from these values, with respect to each pixel in the image, the Gabor feature image is generated by calculating a feature amount made based on five-dimensional elements $V_1$ through $V_5$, which will be described below.

A first dimensional element $V_1$ of the feature amount is expressed by

[Numerical expression 2]

$$V_1 = \sqrt{\sum_k |g_k|^2} \quad (2)$$

$$= \sqrt{\sum_k \{(g_k^{real})^2 + (g_k^{imag})^2\}}, k = 0 \sim 3$$

The first dimensional element $V_1$ is an amount that indicates the strength of an edge included in the image.

A second dimensional element $V_2$ through a fifth dimensional element $V_5$ are expressed by

[Numerical expression 3]

$$V_{k+2} = \frac{|g_k|}{\sqrt{\sum_k |g_k|^2}} \quad (3)$$

$$= \frac{\sqrt{(g_k^{real})^2 + (g_k^{imag})^2}}{\sqrt{\sum_k \{(g_k^{real})^2 + (g_k^{imag})^2\}}}, k = 0 \sim 3$$

The elements of the second dimensional through the fifth dimensional are amounts that indicate the directions of the edges included in the image.

The template selecting unit 25 is a selecting unit that, when the face part image is detected, selects a plurality of templates from the templates 12a to 12c suitable for an image, by using the result learned by the learning processing unit 22. The face-part-image detecting unit 26 is a detecting unit that detects a face part image by using the templates 12a to 12c that are selected by the template selecting unit 25.

More particularly, the face-part-image detecting unit 26 selects respective nine points of pixels of the image, by using the first templates 12a to 12c. Based on the information on the edge strength and the edge direction of the Gabor feature image corresponding to these pixels, the linear discrimination analysis is executed to determine whether the image is a face part image.

The linear discriminant used for the linear discrimination analysis is expressed by

[Numerical expression 4]

$$z = \sum_i a_i w_i + a_o \quad (4)$$

where $a_0$ and $a_i$ are coefficients, $w_i$ is a variable in which the values of five-dimensional feature amounts $V_1$ through $V_5$ at the nine points being selected by the templates 12a to 12c are substituted, and i takes a value from 1 to 45 (nine points times five dimensions).

The coefficient $a_i$ of the linear discriminant is calculated in advance, so as to properly determine whether the image is a face part image. A value of z is obtained by substituting the values of the five-dimensional feature amounts $V_1$ through $V_5$ at the nine points to the linear discriminant, and the greater the value of z (discriminant score), the higher the odds that the image is determined to be a face part image.

The face-part-image detecting unit 26 calculates a value by multiplying the weights of the templates 12a to 12c being used by the discriminant scores, for each pixel to be detected of the face part image, and sets the result as a verification value. If the verification value is smaller than a predetermined threshold, the image is determined not to be a face part image.

When the verification value is larger than a predetermined threshold, the face-part-image detecting unit 26 calculates the discriminant score by using the next templates 12a to 12c. Then, the face-part-image detecting unit 26 adds the value obtained by multiplying the weights of the templates 12a to 12c being used by the discriminant score, to the verification value, and sets the result as a new verification value. In this case, when the verification value is smaller than a predetermined threshold, the face-part-image detecting unit 26 determines that the image is not a face part image.

When determining the image is not a face part image, in preparation for a detection of a face part image by using the next templates 12a to 12c, the face-part-image detecting unit 26 excludes the pixels to be detected of the face part image that have been used and failed to detect a face part image as the pixels to be detected to detect a face part image by using the next templates 12a to 12c.

Figure 3:
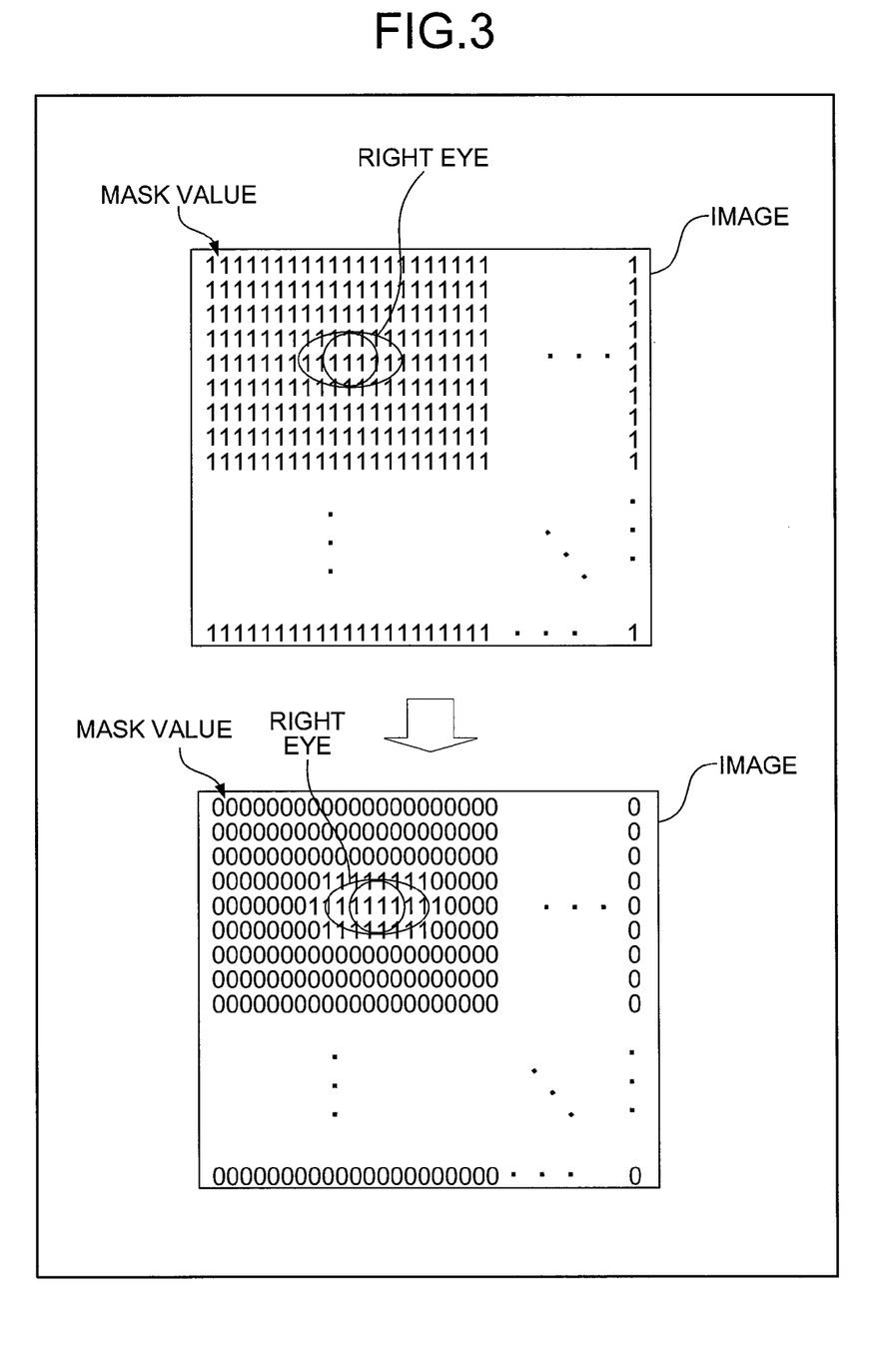
FIG. 3 is a schematic diagram for explaining an exclusion process of pixels to be detected of a face part image, when a face part image is to be detected.

FIG. 3 is a schematic diagram for explaining an exclusion process of pixels to be detected of a face part image, when a face part image is detected. While FIG. 3 shows an example of detecting an image of the right eye, the similar exclusion process of the pixels to be detected is performed, when any of the other face part images is detected.

As shown in FIG. 3, when applying the first templates 12a to 12c, the face-part-image detecting unit 26 sets mask values of all the pixels to "1", and makes all the pixels as the pixels to be detected for detecting an image of the right eye.

Then, the face-part-image detecting unit 26 sets the mask values of the pixels to be detected to "0", as a result of detecting the image of the right eye by using the first templates 12a to 12c, and determined not to be the image of the right eye. Accordingly, the face-part-image detecting unit 26 performs a process of excluding the pixels from the pixels to be detected for detecting an image of the right eye by using the next templates 12a to 12c.

Referring back to FIG. 2, the face-image representative-point calculating unit 27 is a calculating unit that calculates a position of the representative point 13. The representative point 13 represents the position of the face image from the position of each face part image that is detected by the face-part-image detecting unit 26.

More particularly, the face-image representative-point calculating unit 27 obtains setting information related to the representative point setting the representative point 13 of the face image at which direction and how many pixels away from the pixels to be detected when each face part image is detected using the respective templates 12a to 12c.

Based on the information related to the representative point and the positional information of each face part image, the face-image representative-point calculating unit 27 calculates a distribution of the position of the representative point 13 of the face image. The face-image representative-point calculating unit 27 then determines the position of the representative point 13 of the face image, by calculating a point that is equal to or more than a predetermined threshold.

The face-image-detection feature-amount generating unit 28 is a generating unit that generates a feature amount used for detecting a face image from the image by the linear discrimination analysis. More particularly, the face-image-detection feature-amount generating unit 28 divides the image into nine divided areas 14, by separating the image with a predetermined number of pixels, having the representative point 13 in the center. The representative point 13 is calculated by the face-image representative-point calculating unit 27.

The face-image-detection feature-amount generating unit 28 calculates a total value of the verification values of the respective face part images obtained by applying the respective templates 12a to 12c. The total value is calculated for each of the divided areas 14 where the pixels to be detected with which the face part image has been detected are positioned. From the total value, the face-image-detection feature-amount generating unit 28 generates thirty six-dimensional (nine areas times four face parts of the right eye, the left eye, the nose, and the mouth) feature amounts that determine whether the image is a face image or a non-face image.

The face-image detecting unit 29 is a processing unit that detects a face image from an image by performing a thirty six-dimensional linear discrimination analysis, using the thirty six-dimensional feature amounts generated by the face-image-detection feature-amount generating unit 28.

The linear discriminant used by the linear discrimination analysis is similar to that of Equation (4). However, in this case, $a_0$ and $a_i$ are coefficients calculated in advance so as to properly determine whether the image is a face image, $w_i$ is a variable in which each value of the thirty six-dimensional feature amounts is substituted, and i takes a value from 1 to 36.

The storage unit 30 is a storing device such as a hard disk device. The storage unit 30 stores therein respective data, such as an input image 30a, reduced/enlarged images 30b, a Gabor feature image 30c, template information 30d, a face-part-image-detection linear discriminant 30e, a face-part-image discrimination result 30f, representative-point setting information 30g, a face-image-detection linear discriminant 30h, and a face-image discrimination result 30i.

The input image 30a is an image in which a face image is to be detected. The reduced/enlarged images 30b are a plurality of images of different reduction ratios or enlargement ratios that are generated based on the input image 30a. The reduced/enlarged images 30b correspond to the reduced images 11a to 11c or the enlarged images that are explained with reference to FIG. 1, for example. The Gabor feature image 30c is made based on five-dimensional feature information of each pixel, obtained by applying the Gabor filter to the reduced/enlarged images 30b.

The template information 30d is information on the templates 12a to 12c used for detecting a face part image. More particularly, the template information 30d is information on relative positions of eight pixels to be extracted, when the face part image with respect to the pixels to be detected of the face part image is detected. The template information 30d is also information on weights of the respective templates 12a to 12c.

The face-part-image-detection linear discriminant 30e is information on the linear discriminant used for detecting a face part image. The face-part-image discrimination result 30f includes information on the result of the linear discrimination analysis, when the face part image is detected. More particularly, the face-part-image discrimination result 30f includes positional information on the pixels to be detected with which each part image being detected by the linear discrimination analysis have been detected. The face-part-image discrimination result 30f also includes the template 12a to 12c being used, the discriminant score, the information on the verification value, for example.

The representative-point setting information 30g includes setting information on a positional relationship between each face part image and the representative point 13 of the face image. More particularly, the representative-point setting information 30g includes information on the direction and the distance (the number of pixels) where the representative point 13 exists, with each face part, viewed from the pixels to be detected with which the face part image is detected.

The face-image-detection linear discriminant 30h is information on the linear discriminant used for detecting a face image. The face-image discrimination result 30i includes result information of a linear discrimination analysis, when the face image is detected. More particularly, the face-image discrimination result 30i includes positional information on the representative point 13 of the face image and information on the discriminant score, when the image is determined whether to be a face image by using the linear discrimination analysis.

The control unit 31 is a control unit that controls the entire face-image detecting apparatus, and exchanges data among respective functional units of the face-image detecting apparatus.

Figure 4:
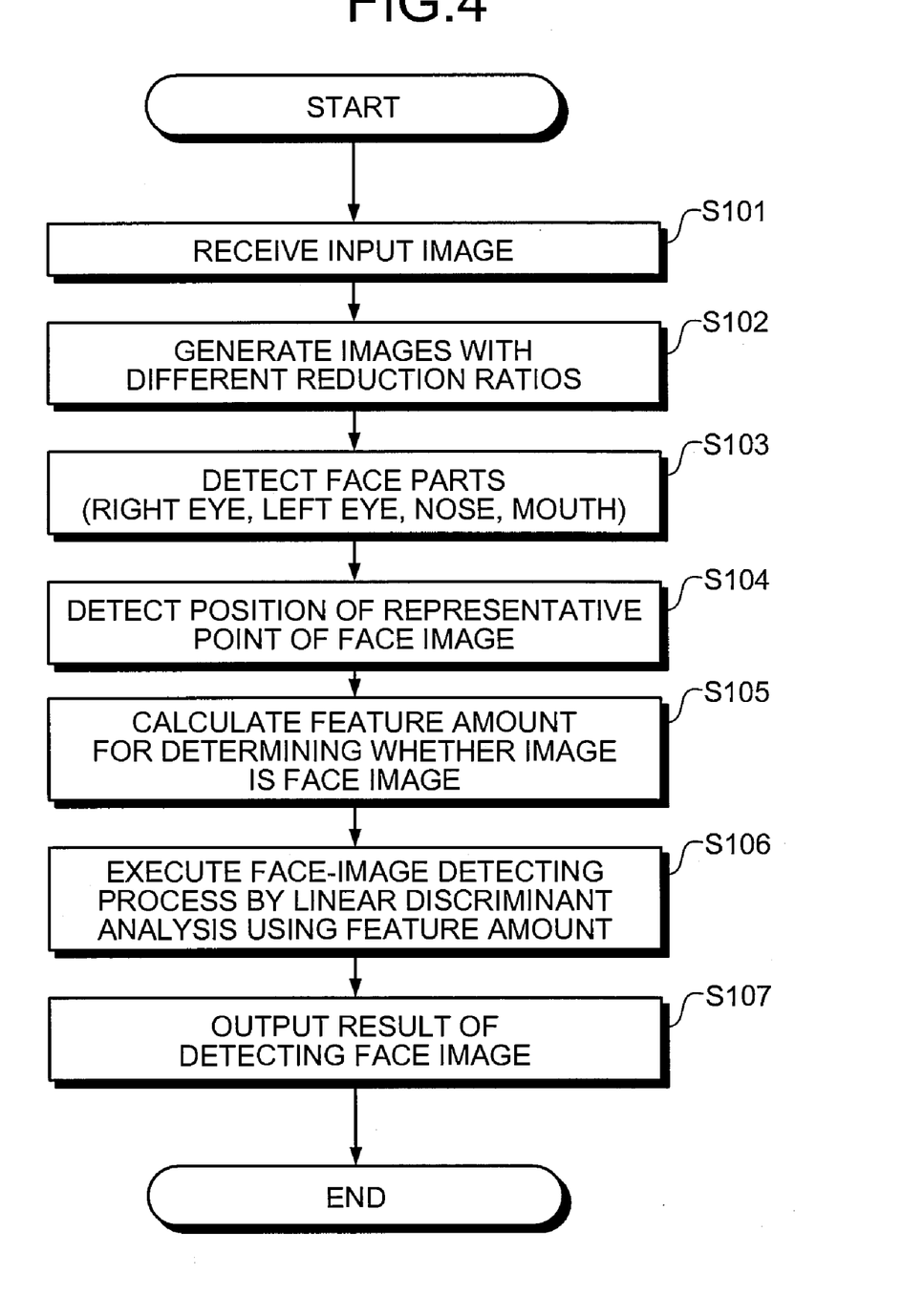
FIG. 4 is a flowchart showing a process procedure of the face-image detecting process according to the present embodiment.

Next, a processing procedure of the face-image detecting process according to the present embodiment will be explained. FIG. 4 is a flowchart showing a process procedure of the face-image detecting process according to the present embodiment.

As shown in FIG. 4, the reduced/enlarged-image generating unit 23 of the face-image detecting apparatus receives an input of an image in which a face image is to be detected (Step S101). The reduced/enlarged-image generating unit 23 then generates a plurality of the reduced images 11a to 11c with different reduction ratios from the received image (Step S102). While the reduced/enlarged-image generating unit 23 that generates the reduced images 11a to 11c is herein described as an example, a similar process to the one hereinafter to be described is also performed when the reduced/enlarged-image generating unit 23 generates the enlarged images, or both the reduced images 11a to 11c and the enlarged images.

Subsequently, the Gabor-feature-image generating unit 24, the template selecting unit 25, and the face-part-image detecting unit 26 apply the templates 12a to 12c with respect to the reduced images 11a to 11c with different reduction ratios, calculate a verification value using the linear discrimination analysis, and perform a process of detecting the respective face part images of the right eye, the left eye, the nose, and the mouth (Step S103). The detection process of the face part image will be described in detail in FIG. 5.

The face-image representative-point calculating unit 27 calculates a position of the representative point 13 of the face image, from the position of the face part images that are detected by the Gabor-feature-image generating unit 24, the template selecting unit 25, and the face-part-image detecting unit 26 (Step S104).

Subsequently, the face-image-detection feature-amount generating unit 28 divides the image into nine divided areas 14, by separating the image with a predetermined number of pixels, having the representative point 13 in the center. The representative point 13 is calculated using the face-image representative-point calculating unit 27. The face-image-detection feature-amount generating unit 28 then calculates a total value of the verification values of each face part image with each of the divided areas 14, where the pixels to be detected with which the face part image has been detected, are positioned. The face-image-detection feature-amount generating unit 28 generates the thirty six-dimensional feature amounts that determine whether the image is a face image or a non-face image from the total value (Step S105).

Then, the face-image detecting unit 29 executes a face-image detecting process that detects a face image from the image, by the linear discrimination analysis using the thirty six-dimensional feature amounts (StepS106), outputs the detection result of the face image (StepS107), and finishes the face-image detecting process.

Figure 5:
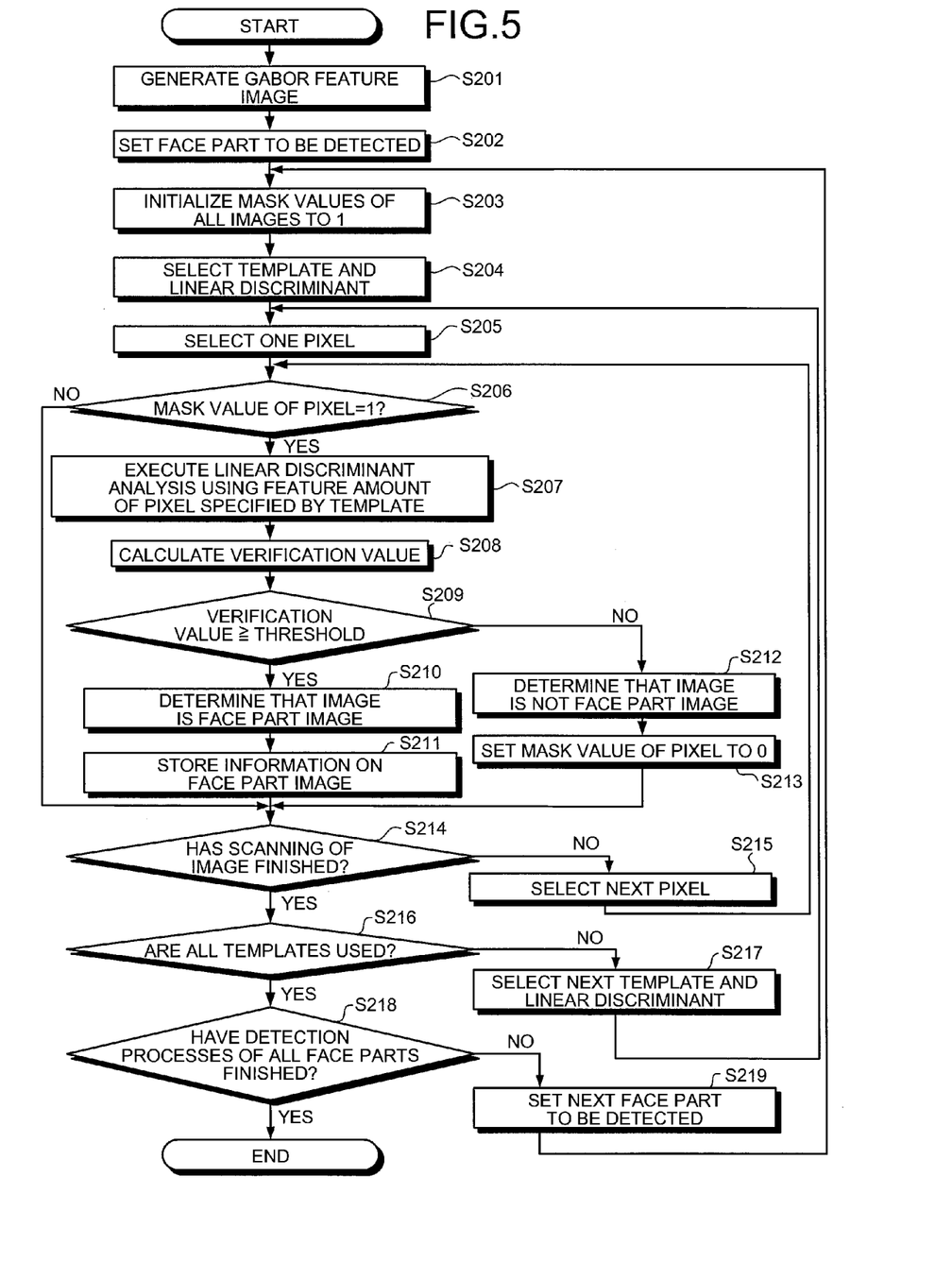
FIG. 5 is a flowchart showing a process procedure of a detection process of the face part image shown at Step S103 in FIG. 4

Next, a processing procedure of the detection process of the face part image shown at Step S103 in FIG. 4 will be explained. FIG. 5 is a flowchart showing a processing procedure of the detection process of the face part image shown at Step S103 in FIG. 4.

As shown in FIG. 5, the Gabor-feature-image generating unit 24 generates a Gabor feature image each of whose pixel is formed of five-dimensional elements, by using Equations (2) and (3) (Step S201). The face-part-image detecting unit 26 sets a face part to be initially used to detect an image (Step S202).

Subsequently, the face-part-image detecting unit 26 initializes mask values of all the pixels of the image to "1", so as to make all the pixels as the pixels to be detected to detect a face part image (Step S203). The template selecting unit 25 selects the templates 12a to 12c that are suitable for detecting a face part image from the input image 10, based on the result learned by the learning processing unit (Step S204).

Then, the face-part-image detecting unit 26 selects one pixel to detect a face part image (Step S205), and checks whether the mask value of the selected pixel is "1" (Step S206).

If the mask value is "1" (YES at Step S206), the face-part-image detecting unit 26 executes a linear discrimination analysis by using the five-dimensional feature amounts at the Gabor feature image of the pixel specified by the templates 12a to 12c (Step S207). The face-part-image detecting unit 26 calculates a verification value used for determining whether the image is a face part image from the discriminant score and the weights of the respective templates 12a to 12c (Step S208).

The face-part-image detecting unit 26 checks whether the verification value is equal to or more than a predetermined threshold (Step S209). If the verification value is equal to or more than a predetermined threshold (YES at Step S209), the image is determined to be a face part image (Step S210). Information on the position of the pixel to be detected with which the face part image has been detected, the discriminant score, the verification value, and the like are stored therein (Step S211).

Then, the face-part-image detecting unit 26 checks whether the scanning of the image has finished, by selecting all the pixels (Step S214). At Step S209, if the verification value is not equal to or more than a predetermined threshold (NO at Step S209), the face-part-image detecting unit 26 determines that the image is not a face part image (Step S212), sets the mask value of the pixel to "0", so as to exclude the pixel to be detected from the pixels to be used to detect a face part image (Step S213), and the process control proceeds to Step S214.

At Step S206, if the mask value of the selected pixel is not "1" (NO at Step S206), the process control proceeds to Step S214. At Step S214, if the scanning of the image is not yet finished (NO at Step S214), the face-part-image detecting unit 26 selects the next pixel to be detected to detect a face part image (Step S215), and the process control returns to Step S206 to continue with the subsequent processes.

When the scanning of the image is finished (YES at Step S214), the face-part-image detecting unit 26 checks whether all the templates 12a to 12c are used (Step S216).

If not all the templates 12a to 12c are used (NO at Step S216), the template selecting unit 25 selects the next templates 12a to 12c (Step S217), and the process control returns to Step S205 to continue with the subsequent processes.

If all the templates 12a to 12c are used (YES at Step S216), the face-part-image detecting unit 26 checks whether the detection processes of all the face part images have finished (Step S218).

When the detection processes of not all the face part images are finished (NO at Step S218), the face-part-image detecting unit 26 sets a face part to be used next to detect the image (Step S219), and the process control returns to Step S203 to continue with the subsequent processes. When the detection processes of all the face part images have finished (YES at Step S218), the detection process of the face part image is finish.

Figure 6:
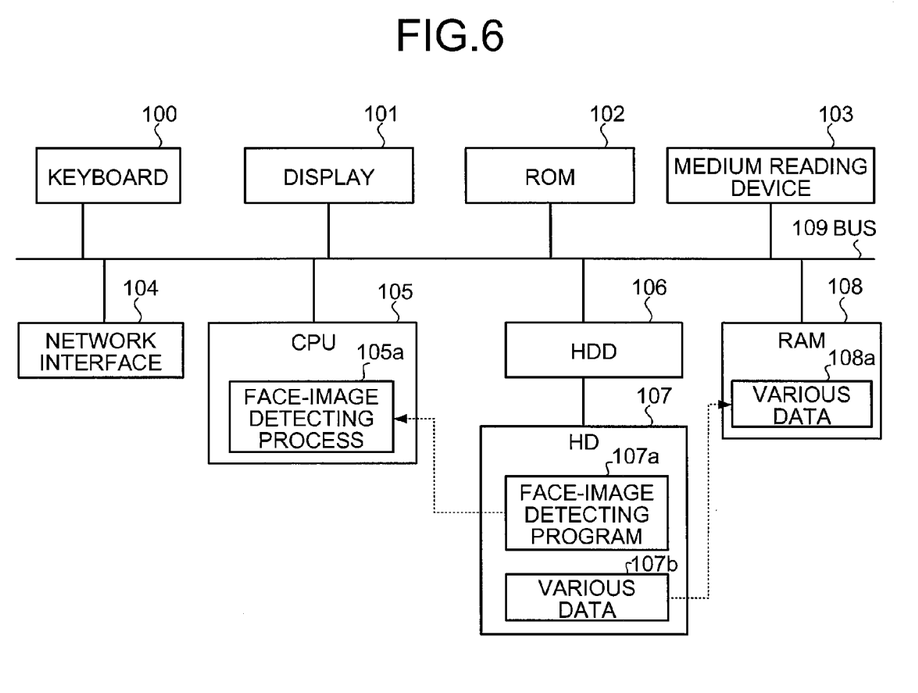
FIG. 6 is a schematic diagram showing a hardware setting of the face-image detecting apparatus shown in FIG. 2.

Next, a hardware setting of the face-image detecting apparatus shown in FIG. 2 will be explained. FIG. 6 is a schematic diagram showing a hardware setting of the image processing apparatus shown in FIG. 2. As shown in FIG. 6, the face-image detecting apparatus includes a keyboard 100, a display 101, a read only memory (ROM) 102, a medium reading device 103 that reads a program from a recording medium in which various programs are recorded, a network interface 104 that exchanges data between other computers via a network, a central processing unit (CPU) 105, a hard disk drive (HDD) 106, and a random access memory (RAM) 108, all of which are connected by a bus 109.

A hard disk (HD) 107 is a storage medium whose storage and reading are controlled by the HDD 106 and stores therein a face-image detecting program 107a. The face-image detecting program 107a is realized by executing the face image detection method described in the present embodiment by a computer. When the face-image detecting program 107a is read out from the HD 107 during the execution, the CPU 105 analyzes this, and a face-image detecting process 105a is executed.

The face-image detecting process 105a corresponds to each function of the learning processing unit 22, the reduced/enlarged-image generating unit 23, the Gabor-feature-image generating unit 24, the template selecting unit 25, the face-part-image detecting unit 26, the face-image representative-point calculating unit 27, the face-image-detection feature-amount generating unit 28, and the face-image detecting unit 29 shown in FIG. 2.

Various data 107b are stored in the HD 107, and when the face-image detecting program 107a is executed, the various data 107b are stored in the RAM 108. Various data 108a stored in the RAM 108 are referenced by the CPU 105.

The various data 107b correspond to various data such as the input image 30a, the reduced/enlarged images 30b, the Gabor feature image 30c, the template information 30d, the face-part-image-detection linear discriminant 30e, the face-part-image discrimination result 30f, the representative-point setting information 30g, the face-image-detection linear discriminant 30h, and the face-image discrimination result 30i shown in FIG. 2.

As described above, in the present embodiment, the storage unit 30 of the face-image detecting device stores therein the information related to the different templates 12a to 12c that extract a predetermined number of pixels from the pixels surrounding the pixel to be detected of the face part image. The face-part-image detecting unit 26 extracts the pixels by using the different templates 12a to 12c stored in the storage unit 30, detects a face part image in the image by using the feature amounts of the extracted pixels. The face-image detecting unit 29 detects a face image from the image based on the face part image detected by the face-part-image detecting unit 26. Accordingly, the detection process of the face part image can be performed at a high speed by controlling the number of pixels to be extracted. As a result, the time required for detecting a face image can be shortened, and the detection accuracy of the face can be improved by detecting a face part image, which is a base for detecting a face image, a plurality of times.

In the present embodiment, the learning processing unit 22 executes the machine-learning of the templates 12a to 12c that are used for detecting a face part image, and the storage unit 30 stores therein the information on the templates 12a to 12c that are machine-learned. As a result, the extraction pattern and the like that extract the pixels at a portion with little illumination fluctuation can be efficiently selected.

In the present embodiment, when detecting the face part image by using certain templates 12a to 12c, the face-part-image detecting unit 26 excludes the pixel with which no face part image has been detected as the pixels to be detected to detect a face part image by using the next templates 12a to 12c. As a result, the time required for the detection process of the face image can further be shortened.

In the present embodiment, the face-part-image detecting unit 26 executes the discrimination analysis that determines whether the image is a face part image based on the feature amount of the extracted pixel by using the templates 12a to 12c. Because the face part image is detected based on the result of the discrimination analysis, whether the image is a face part image can be determined efficiently. As a result, the time required for the detection process of the face image can further be shortened.

In the present embodiment, the Gabor-feature-image generating unit 24 calculates the direction and the strength of the image pattern such as an edge included in the input image 10. The face-part-image detecting unit 26 detects a face part image in the image by using the direction and the strength of the image pattern calculated by the Gabor-feature-image generating unit 24 as the feature amount of the pixel. By using the direction and the strength of the image pattern as the feature amount, the patterns such as an edge can be detected with accuracy. As a result, the detection accuracy of the face part image can be improved.

In the present embodiment, the face-image detecting unit 29 determines whether the image is a face image, based on the position of the face part image detected by the face-part-image detecting unit 26. Because a face image is detected from the image based on the determination result, even if something that is not a face part image is detected as a face part image by mistake, it can be properly identified. As a result, the detection accuracy of the face image can be improved.

In the present embodiment, the face-image representative-point calculating unit 27 calculates the representative point 13 of the face, based on the face part image detected by the face-part-image detecting unit 26. Then, the face-image detecting unit 29 determines whether the image is a face image, based on the positional relationship between the representative point 13 calculated by the face-image representative-point calculating unit 27 and the face part image detected by the face-part-image detecting unit 26. Accordingly, the position of the point that represents the face image in the image can be properly detected. As a result, the detection accuracy of the face image can be improved.

In the present embodiment, the face-image-detection feature-amount generating unit 28 divides the image into a plurality of divided areas 14 based on the representative point 13. The face-image detecting unit 29 detects a face image by determining whether the image is a face image, based on the information of the divided area 14 where the face part image is positioned, when the face part image is detected. By checking in which of the divided areas 14 the pixels to be detected of the face part image exist, even if something that is not a face part is detected as a face part by mistake, it can be properly detected. As a result, the detection accuracy of the face image can be improved.

In the present embodiment, the face-image detecting unit 29 executes the discrimination analysis that determines whether the image is a face image by using the information of the divided areas 14 where the face part image is positioned. Because the face image is detected based on the result of the discrimination analysis, whether the image is a face image can be determined efficiently. As a result, the detection accuracy of the face image can be improved.

While the exemplary embodiments of the present invention have been described, the present invention is not limited to the above-described embodiments, and various modifications can be made within the spirit and scope of the appended claims.

For example, in the embodiment, the image is divided into nine divided areas 14, and whether the image is a face image is determined by checking in which of the divided areas 14 the face part image is detected. However, the present invention is not limited to this, and whether the image is a face image may be determined by determining whether the face part image exists at a position where the face part image is presumed to exist.

Figure 7:
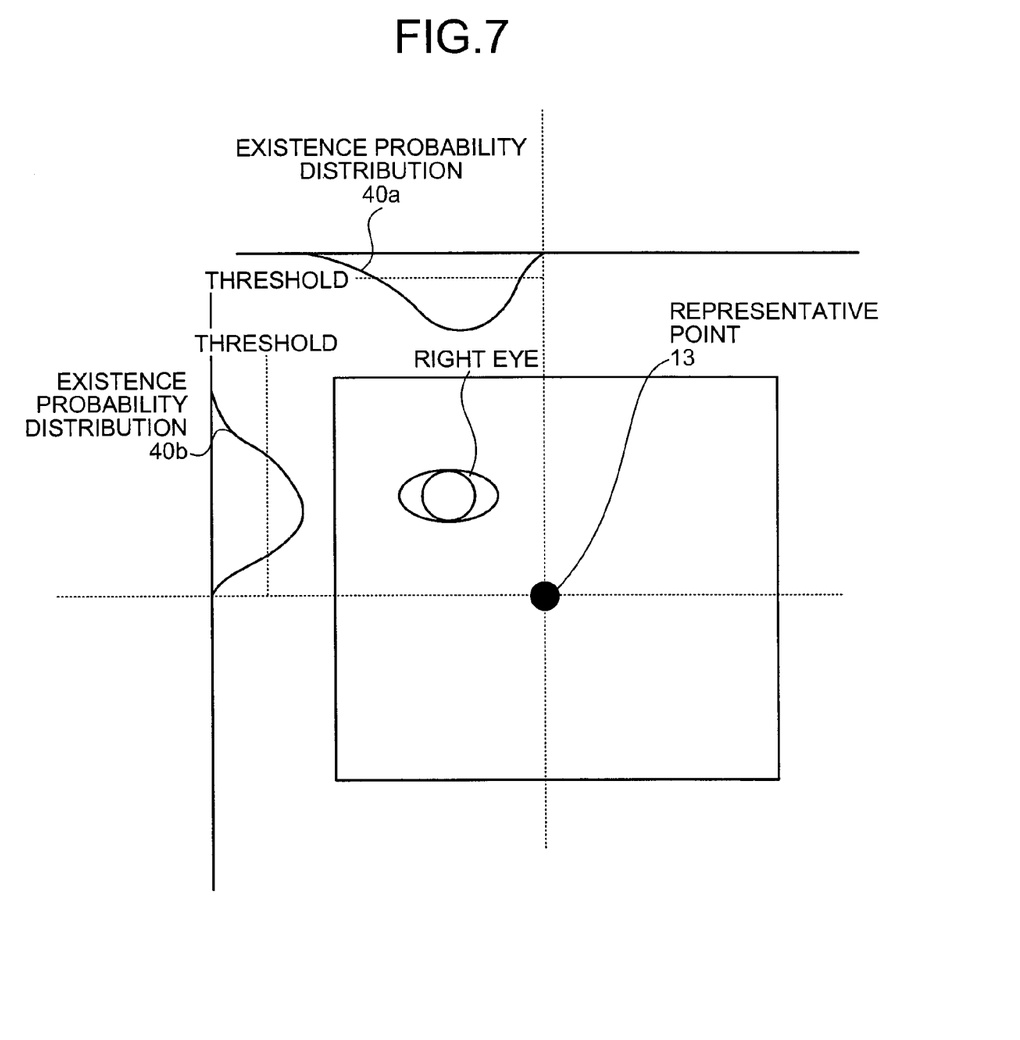
FIG. 7 is a schematic diagram for explaining a determination process that determines whether the face part image exists at a position where the face part image is presumed to exist.

FIG. 7 is a schematic diagram for explaining a determination process that determines whether the face part image exists at a position where the face part image is presumed to exist. As shown in FIG. 7, in the determination process, a distribution of presumed positions of the face part image (existence probability distributions 40a and 40b shown in FIG. 7) is learned in advance, based on the position of the representative point 13 of the face.

The face-image detecting unit 29 determines that the face part is properly positioned, when the position of the face part image is included within a range equal to or more than a threshold of the distribution. The face-image detecting unit 29 performs the detection process to all the face parts, and when all the face part images are determined to be positioned at the proper positions, the image is determined to be a face image.

In this example, the face-image detecting unit 29 determines whether the image is a face image based on the positional relationship between the face part image and the representative point 13. By checking what positional relationship the face part image has with the representative point 13, even if something that is not a face part image is detected as a face part image by mistake, it can be properly detected. As a result, the detection accuracy of the face image can be improved.

In the embodiment, the face part image or the face image is detected by performing the linear discrimination analysis. However, the present invention is not limited to this, and the detection of the face part image or the face image can be executed by using other statistical methods. The other statistical methods may be a non-linear discrimination analysis, or identification methods of the face part image or the face image by using a support vector machine (SVM) method, a neutral network method, and a subspace method.

Among the respective processes explained in the present embodiment, all or a part of the process explained as being performed automatically may be performed manually. Or, all or a part of the process explained as being performed manually may be performed automatically using a known method. The information including the process procedure, the controlling procedure, specific names, and various data and parameters shown in the specification or in the drawings may be changed in any way, unless otherwise specified.

The respective constituent elements of the face-image detecting apparatus shown in the drawings are functional concepts, and the same physical setting as in the drawings is not necessarily required. In other words, the specific mode of dispersion and integration of the face-image detecting apparatus is not limited to the ones shown in the drawings, but all or a part thereof may be functionally or physically dispersed or integrated in any unit, depending on various loads and usage states.

All or any part of the respective processing functions performed in the face-image detecting apparatus can be realized by the CPU and a program that is analyzed and executed by the CPU, or may be realized as hardware by a wired logic.

The face image detection method explained in the present embodiment may be realized by executing a program prepared in advance by a computer such as a personal computer or a workstation.

The program may be distributed via a network, such as the Internet. Also, the program may be executed by being recorded in a computer readable storage medium, such as a hard disc, a flexible disc (FD), a CD-ROM, an MO, and a DVD, and by being read out from the storage medium by the computer.

INDUSTRIAL APPLICABILITY

As described above, the face-image detecting apparatus, the face-image detecting method, and the face-image detecting program according to the present invention improve the detection accuracy of a face image, and are advantageously applicable to a face-image detecting system that needs to shorten the time required for the detection process of a face image.

The invention claimed is:

1. An apparatus for detecting a face image included in an image, the apparatus comprising:
   a storage unit configured to store therein information related to a plurality of different extraction patterns for extracting a predetermined number of pixels for detecting each of face part images, the extraction patterns differ in at least one of shape and size;
   a control unit configured to receive the image including the face image from an external device and to store the received image in the storage unit;
   a face-part-image detecting unit configured to extract the pixels from the received image by using a plurality of the extraction patterns stored in the storage unit for each of the face part images, and to detect each of the face part images included in the received image based on feature amounts calculated from the extracted pixels of each of the extraction patterns; and
   a face-image detecting unit configured to detect the face image from the received image based on the face part images detected by the face-part-image detecting unit.

2. The apparatus according to claim 1, further comprising an extraction-pattern learning unit configured to execute a machine learning of the extraction patterns used for detecting the face part images, wherein the storage unit is configured to store therein information related to the extraction patterns that are machine-learned by the extraction-pattern learning unit.

3. The apparatus according to claim 1, wherein the face-part-image detecting unit is configured to exclude a pixel from which the face part image is not detected by using one of the extraction patterns from target pixels for detecting the face part image by using the other extraction pattern.

4. The apparatus according to claim 1, wherein the face-part-image detecting unit is configured to execute a discrimination analysis for determining whether an image specified by an extraction pattern from the plurality of different extraction patterns is a face part image using the feature amount calculated from the extracted pixels, and to detect the face part image based on a result of the discrimination analysis.

5. The apparatus according to claim 1, wherein the face-part-image detecting unit is configured to calculate feature amounts related to a direction and a strength of an image extracted by the extraction pattern and to determine whether an image specific by the extraction pattern is the face part image based on the feature amount.

6. The apparatus according to claim 1, wherein the face-image detecting unit is configured to determine whether a given image is a face image based on positions of the face part images detected by the face-part-image detecting unit, and to detect the face image from the given image based on a determined result.

7. The apparatus according to claim 6, wherein the face-image detecting unit is configured to calculate a position of a representative point of the face image based on a position of the face part image detected by the face-part-image detecting unit, and to determine whether the given image is a face image based on a positional relationship between the representative point and the detected face part image.

8. The apparatus according to claim 7, wherein the face-image detecting unit is configured to divide the given image into a plurality of areas based on the representative point, and to detect the face image by determining whether the given image is a face image based on information of the area where the detected face part image is positioned.

9. The apparatus according to claim 8, wherein the face-age detecting unit is configured to execute a discrimination analysis for determining whether the given image is a face image using the information of the area where the detected face part image is positioned, and to detect the face image based on a result of the discrimination analysis.

10. A method of detecting a face image included in an image by using an apparatus for detecting a face image, the face-image detecting method comprising:
receiving an image including a face image from an external device;
storing, in a storage unit, a received image and information related to a plurality of different extraction patterns for extracting a predetermined number of pixels for detecting each of the face part images, the extraction patterns differ in at least one of shape and size;
face-part-image detecting including:
extracting pixels by using a plurality of the extraction patterns stored in the storage unit for each of the face part images, and
detecting each of the face part images included in the received image based on feature amounts calculated from the extracted pixels of each of the extraction patterns; and
face-image detecting for detecting the face image from the received image based on the face part images detected at the face-part-image detecting.

11. The method according to claim 10, further comprising machine-learning the extraction patterns used for detecting the face part images, wherein the storing includes storing information related to the extraction patterns that are machine-learned at the machine-learning.

12. A non-transitory computer-readable recording medium that stores therein a computer program for detecting a face image included in an image, the computer program causing a computer to execute:
storing information related to a plurality of different extraction patterns for extracting a predetermined number of pixels from a plurality of pixels surrounding a target pixel that is a target for detecting each of the face part images, the extraction patterns differ in at least one of shape and size;
face-part-image detecting including:
extracting the plurality of pixels using the different extraction patterns stored at the storing for each of the face part images, and
detecting each of the face part images included in the image using feature amounts of the extracted pixels of each of the extraction patterns; and
face-image detecting including detecting the face image from the image based on the face part image detected at the face-part-image detecting.

13. The non-transitory computer-readable recording medium according to claim 12, wherein the computer program further causes the computer to execute machine-learning the extraction patterns used for detecting the face part images, and wherein the storing includes storing information related to the extraction patterns that are machine-learned at the machine-learning.

14. The method according to claim 10, wherein the face-part-image detecting comprises excluding a pixel, from which the face part image was not detected by using a current extraction pattern from the plurality of different extraction patterns, from target pixels for a next extraction pattern from the plurality of different extraction patterns.

15. The method according to claim 10, wherein the face-part-image detecting comprises:
executing a discrimination analysis for determining whether an image corresponding to the extracted pixels extracted in the extracting is a face part image using the feature amount calculated from the extracted pixels, and
performing the face-part-image detecting based on a result of the discrimination analysis.

16. The method according to claim 10, wherein the face-part-image detecting comprises:
calculating feature amounts related to a direction and a strength of an image corresponding to the extracted pixels, and
performing the face-part-image detecting by using the calculated feature amount.

17. The method according to claim 10, wherein the face-image detecting comprises:
determining whether a given image is a face image based on positions of the detected face part images, and
performing the face-image detecting from the given image based on a determined result.

18. The method according to claim 17, wherein the face-image detecting comprises:
calculating a position of a representative point of the face image based on the position of a detected face part image, and
determining whether the given image is a face image based on a positional relationship between the representative point and the detected face part images.

19. The method according to claim 18, wherein the face-image detecting comprises:
dividing the given image into a plurality of areas based on the representative point, and
determining whether the given image is a face image based on information of the area where the detected face part image is positioned.

20. The method according to claim 19, wherein the face-image detecting comprises:
executing a discrimination analysis,
determining whether the given image is a face image based on a result of the discrimination analysis, and
performing the face-image detecting based on a result of the discrimination analysis.

21. The apparatus according to claim 1, further comprising a reduced/enlarged-image generating unit configured to generate an image from the received images,
  wherein the size of the image generated by the reduced/enlarged-image generating unit is determined based on the size of the extraction patterns, and
  wherein the face-part-image detecting unit is configured to detect the face part image by using the extraction patterns and the generated image.

* * * * *